W. H. JONES.
ANGLE IRON WELDING BLOCK.
APPLICATION FILED MAY 1, 1917.

1,259,522.

Patented Mar. 19, 1918.
2 SHEETS—SHEET 1.

Inventor
W. H. Jones

Witnesses

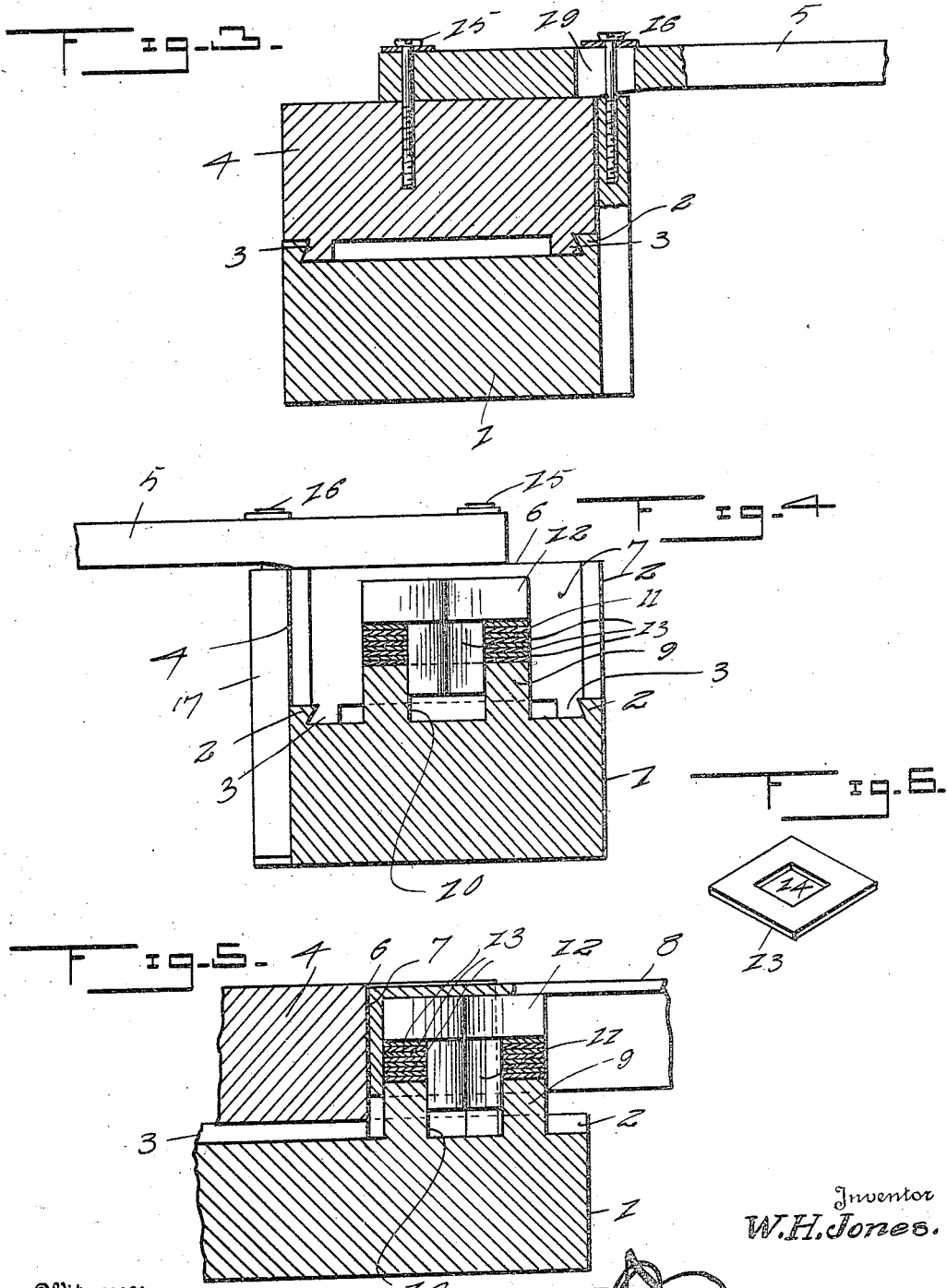

UNITED STATES PATENT OFFICE.

WADE H. JONES, OF RIVER ROUGE, MICHIGAN.

ANGLE-IRON-WELDING BLOCK.

1,259,522.

Specification of Letters Patent.

Patented Mar. 19, 1918.

Application filed May 1, 1917. Serial No. 165,753.

*To all whom it may concern:*

Be it known that I, WADE HAMPTON JONES, a citizen of the United States, residing at River Rouge, in the county of Wayne and State of Michigan, have invented certain new and useful Improvements in Angle-Iron-Welding Blocks; and I do hereby declare the following to be a full, clear, and exact description of the invention, such as will enable others skilled in the art to which it appertains to make and use the same.

The invention relates to an angle iron welding block.

The object of the present invention is to provide a simple, practical and efficient angle iron welding block of strong, durable and comparatively inexpensive construction designed for use under a steam hammer and capable of enabling angle irons of all sizes to be quickly and accurately welded with a smooth weld which will pass Government inspection.

A further object of the invention is to provide a welding block of this character adapted to save time and labor in welding angle irons.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Fig. 3 is a transverse sectional view on the line 3—3 of Fig. 1.

Fig. 4 is a similar view on the line 4—4 of Fig. 1.

Fig. 5 is a longitudinal sectional view on the line 5—5 of Fig. 1.

Fig. 6 is a detail perspective view of one of the plates for varying the height of the angle iron supporting means.

Like numerals of reference designate corresponding parts in the several figures of the drawings.

Figure 1:
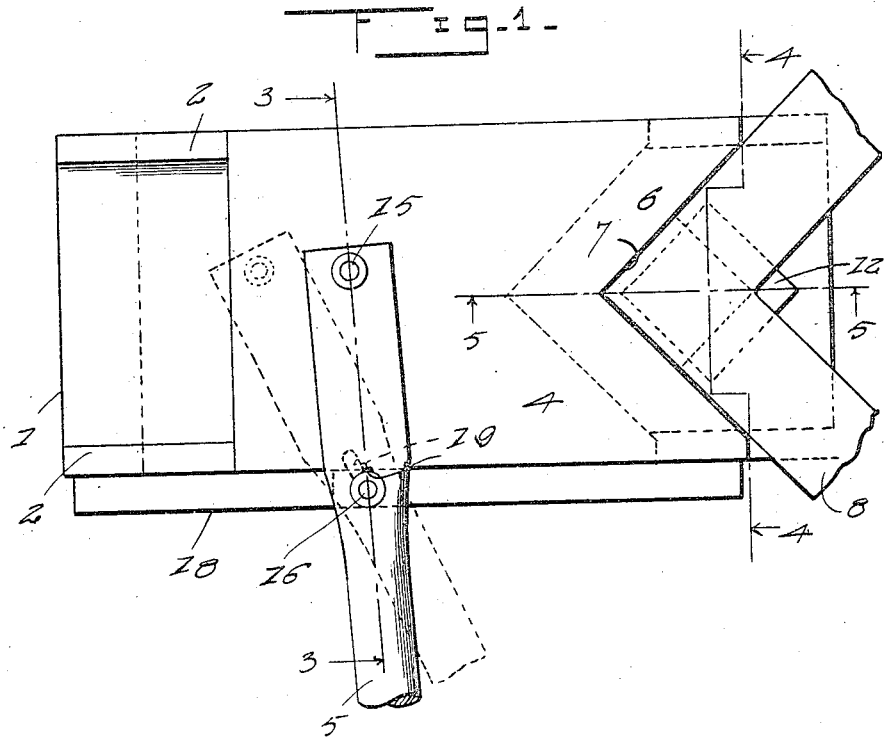
Figure 1 is a plan view of an angle iron welding block constructed in accordance with this invention.
Figure 2:
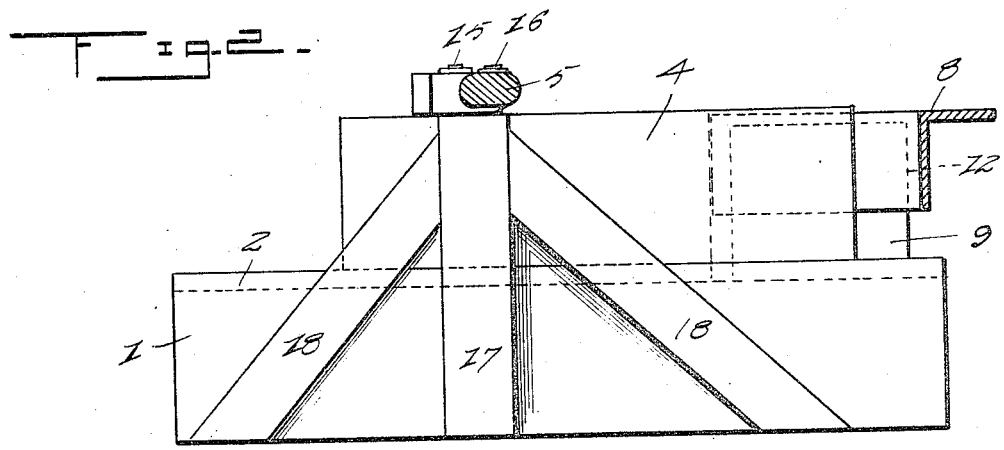
Fig. 2 is a side elevation of the same, the operating lever being in section.

In the accompanying drawings, in which is illustrated the preferred embodiment of the invention, the welding block comprises a base 1 designed to be applied to the slide of a steam hammer, and in practice, it will be made to fit the slides of various steam hammers. The base, which is substantially oblong, is provided at opposite sides with longitudinal flanges 2 extending from the upper face of the base 1 and forming a longitudinal way to receive flanges 3 of a clamping block 4, which is slidably mounted in the guide or way formed by the flanges 2 of the base 1. The flanges 2 are beveled or undercut at their inner faces, and the flanges 3 of the clamping block 4 are correspondingly beveled at their outer faces to fit the flanges 2 of the base. By this construction the clamping block is slidably interlocked with the base.

The clamping block, which is moved backwardly and forwardly by means of an operating lever 5, is provided with forwardly extending jaws 6 having diverging faces 7 arranged at an angle of 90° for welding angle irons at right angles to each other, but the angle may of course be varied as will be readily understood. The jaws of the slidable clamping block are adapted to engage angle bars 8, and they coöperate with a rectangular support 9 consisting of a post provided with a socket 10 adapted to receive a stem 11 of a head 12. The post, which is rectangular, has its diagonals disposed transversely and longitudinally of the base and its inner side faces are arranged in parallelism with the faces 7 of the jaws 6 to receive the vertical webs or flanges of the angle iron when the same are arranged upon the support for welding. The socket 10 is also rectangular and its side walls are arranged in parallelism with the side walls of the post. The shank 11 and the head 12 are also rectangular and the head 12 is adapted to be supported at different elevations by means of plates 13 interposed between the post and the head and provided with rectangular openings 14 for the reception of the stem 11. By this construction, the support may be arranged for accommodating angle irons of various sizes.

The lever, which is connected at its inner end by a pivot 15 to the clamping block, is fulcrumed intermediate of its ends by a pivot 16 to a side frame or support consisting of a central post 17 and oppositely inclined braces 18, but any other suitable means may of course be employed for mounting the operating lever, which is provided with a slot 19 for the reception of the pivot 16. The angle irons are adapted to be placed upon the support with their horizontal flanges resting upon the head 12 and their vertical flanges interposed between the inner side faces of the support and the jaws, which clamp the angle irons in accurate position and enable the operation of welding to be effected in a rapid manner. The joint or weld is smooth and it has been found by experience that when made with the clamping block of the present invention will pass Government inspection. The device is adapted to effect a great saving in time and labor and the block 1 is designed to be shaped to fit the slides of various steam hammers. The device may be quickly adjusted to accommodate angle irons of different sizes by changing the plates 13 which interpose between the post and the head.

What is claimed is:

1. An angle iron welding block including a base provided with a fixed support adapted to receive the angle irons to be welded and having flat side faces and a flat top face to fit the side and top flanges of the same, and a clamping block or member slidably mounted on the base and provided with angularly related jaws arranged to coöperate with the said support and engage the angle irons placed thereon.

2. An angle iron welding block including a base provided with a support comprising a post having a socket, a head having a stem fitting in the socket and interlocked with the post, and removable plates adapted to be interposed between the head and the post to vary the height of the head, and a clamping block coöperating with the support and having jaws for engaging the angle irons.

3. An angle iron welding block comprising a base provided with a guide or way and having a fixed support located in the guide or way and having flat top and side faces and adapted to receive the angle irons to be welded, a clamping block slidably interlocked with the guide or way, a post or standard located at one side of the base, and a lever fulcrumed on the post or standard and connected with the clamping block for moving the same toward and from the said support.

4. An angle iron welding block comprising a base provided with spaced longitudinally disposed flanges, an angle iron support mounted on the base between the flanges and provided with side and top faces to receive the flanges of the angle irons, a clamping block provided with flanges interlocked with the flanges of the base, said clamping block being provided with jaws arranged to coöperate with the said support and clamp the angle bars thereon, and operating means for moving the clamping block toward and from the support.

In testimony whereof I affix my signature in presence of two witnesses.

WADE H. JONES.

Witnesses:
 CHARLOTTE M. ADAMS,
 EMIL MILLER.

Copies of this patent may be obtained for five cents each, by addressing the "Commissioner of Patents, Washington, D. C."